United States Patent [19]
Vasas

[11] 3,891,330
[45] June 24, 1975

[54] SEALING GLAND FOR PRODUCT CONTAINER

[75] Inventor: Martin M. Vasas, Fairfield, Conn.

[73] Assignee: The Bridgeport Metal Goods Manufacturing Company, Bridgeport, Conn.

[22] Filed: Apr. 5, 1973

[21] Appl. No.: 348,103

[52] U.S. Cl............................. 401/122; 15/257.05
[51] Int. Cl............................................ A46b 11/00
[58] Field of Search .......... 401/121, 122; 132/88.7; 722/153; 15/257.05

[56] References Cited
UNITED STATES PATENTS

| | | | |
|---|---|---|---|
| 3,280,421 | 10/1966 | Davidson | 401/122 |
| 3,529,899 | 9/1970 | Gruska | 401/121 |
| 3,662,769 | 5/1972 | Vasas et al. | 401/122 X |

*Primary Examiner*—Lawrence Charles
*Attorney, Agent, or Firm*—Woosfer, Davis & Cifelli

[57] ABSTRACT

A single piece gland is specially configured to provide both the peripheral seal and the portal seal of a reservoir assembly which functions cooperatively with an applicator to create a product container. The construction of the reservoir assembly is simplified by interlocking the gland with a portal bushing utilized therein and the positive affixment attained therebetween permits these component parts to be reliably inventoried as a subassembly. Both the bearing surface of, and the force exerted on the peripheral seal can be predetermined within relatively precise limits to thereby facilitate interchangeability between the component parts of the reservoir assembly.

9 Claims, 4 Drawing Figures

PATENTED JUN 24 1975
3,891,330
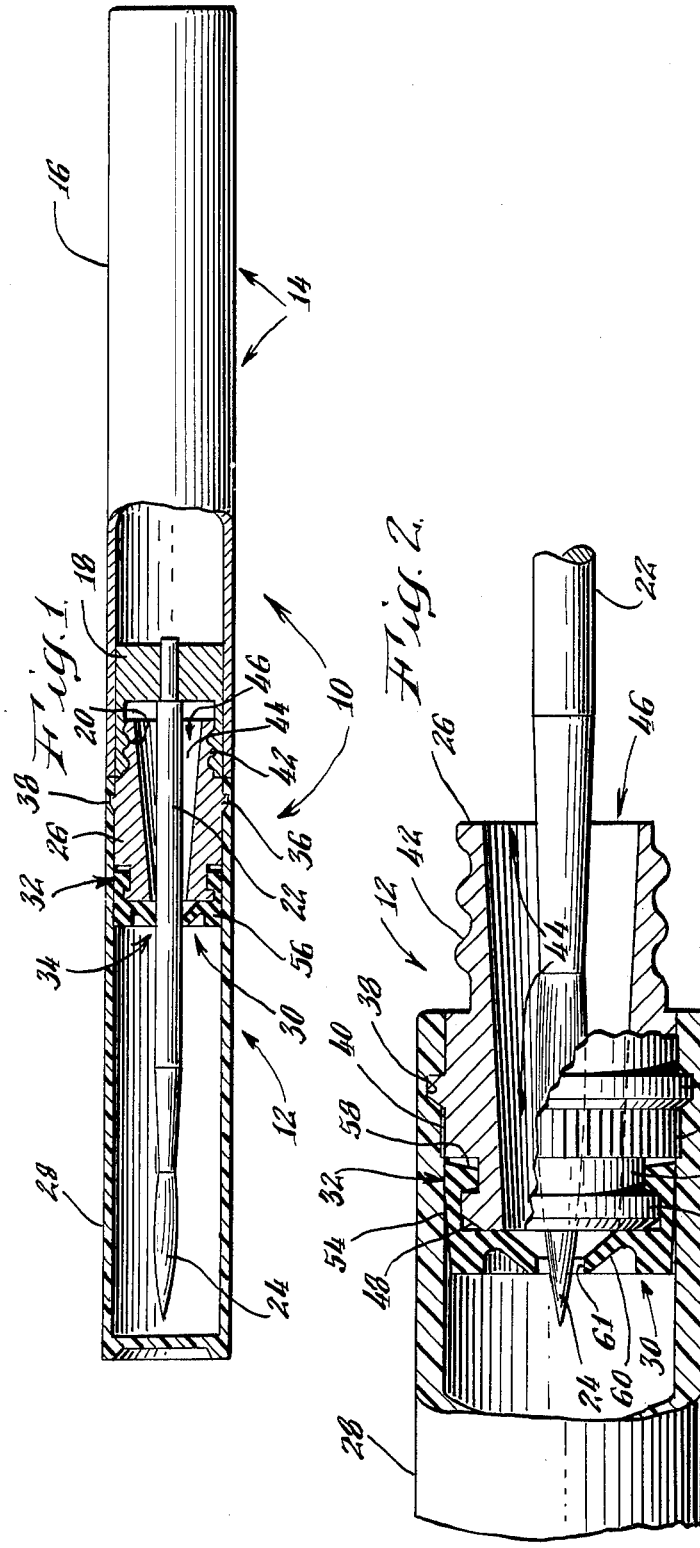
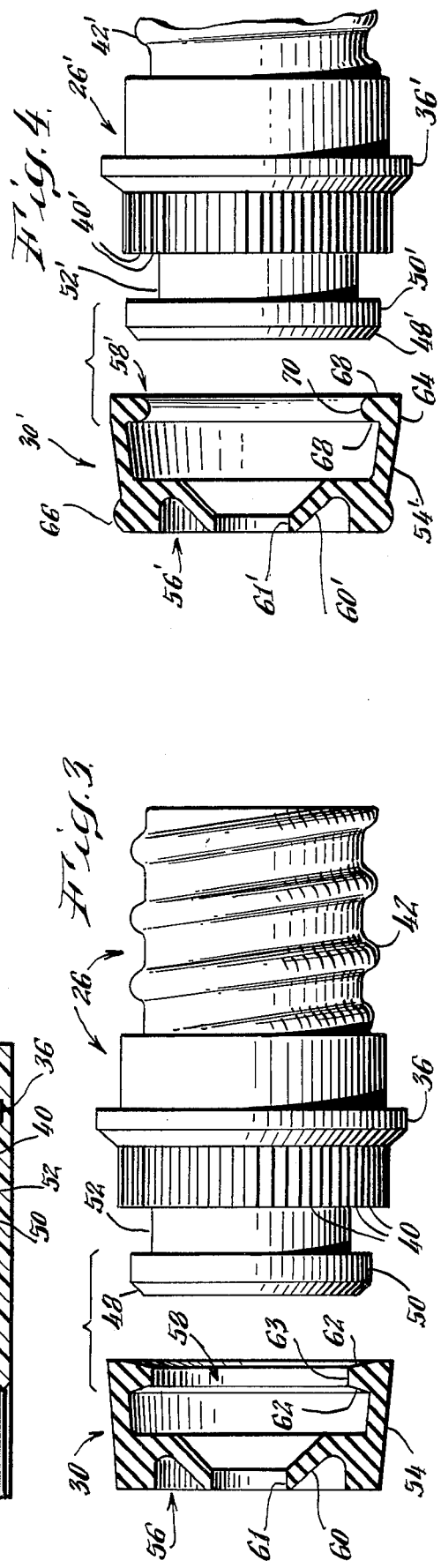

SEALING GLAND FOR PRODUCT CONTAINER

BACKGROUND OF THE INVENTION

The present invention relates to a sealing gland for use in a reservoir assembly and especially such a gland for simplifying the construction thereof, while assuring predetermined sealing parameters therein within relatively precise limits. Reservoir assemblies can be utilized to contain products for a wide variety of purposes, such as cosmetics, paint, glue, or medicine, and those products can be in many different forms, such as liquid, gel, or compressed powder. For most products, an applicator is detachably affixed to the reservoir assembly in creating a product container. Therefore, a sealed access for entry of the applicator is provided into the reservoir assembly through a portal bushing having a peripheral seal therearound and a portal seal therein.

In some reservoir assemblies, the portal seal is achieved with an annular disc which is retained to and aligned with the bushing by a sealing cup which affixes to the bushing through an interference fit. The peripheral seal is then achieved upon pressing the bushing into a reservoir body which provides the storage volume for the product, by the sealing cup which is compressed therebetween. Because a distinct component part is utilized to accomplish each of the required seals in this contruction, these reservoir assemblies present unnecessary complexities in production and, therefore, result in a higher unit cost. Also, the compressibility of the sealing cup is limited by the interference fit which it maintains with the bushing and, therefore, the forces exerted on the peripheral seal can only be controlled within very wide limits. Furthermore, these forces tend to be very unevenly distributed whenever tolerance buildups occur in any or all of the component parts.

In other reservoir assemblies, a single gland is structured to provide both the portal seal and the peripheral seal, with production complexities being reduced accordingly thereby. However, these glands are made of highly compressible material and are retained to the bushing with a stretch fit thereover. Therefore, the interfacing surface covered by the peripheral seal is not controllable as the component parts vary within allowable tolerance and, in most instances, this interfacing between the reservoir body and the bushing is merely a composite of high spots therebetween. In addition to this, it is desirable that the gland be joined reliably to the bushing as a subassembly for inventory purposes, but with this construction the subassembly is only retained by the gripping forces of the stretch fit and no interlock exists between the gland and bushing to assure the integrity of the subassembly.

SUMMARY OF THE INVENTION

It is, therefore, a general object of the present invention to provide for sealed access into a reservoir assembly with a sealing gland which minimizes and obviates the disadvantages of the prior art.

It is a specific object of the present invention to provide for sealed access into a reservoir assembly with a sealing gland which assures creation of a peripheral seal over a minimal surface between a portal bushing and a reservoir body.

It is a more specific object of the present invention to provide for sealed access into a reservoir assembly with a sealing gland which interlocks to a portal bushing for assuring subassembled integrity therewith.

It is another object of the present invention to provide for sealed access into a reservoir assembly with a sealing gland which creates a peripheral seal between a portal bushing and a reservoir body within predetermined sealing parameters having relatively precise limits.

These objects are accomplished in one form by configuring the sealing gland generally as a tubular frame on which an annular lip and a diaphragm are disposed at opposite ends. The gland seats into a reservoir assembly with the lip compressed to apply forces against the tubular frame for sealing the periphery of a portal bushing. In this arrangement, the magnitude of compression and the sealing area are both related to the size of the lip and, therefore, the pressure developed by the peripheral seal can be predetermined within relatively precise limits. The lip is engageable into an annular groove on the bushing to interlock the sealing gland thereto and, therefore, a subassembly of assured integrity is provided thereby. An aperture is disposed through the diaphragm which provides a portal seal around an applicator passing therethrough when the reservoir assembly is utilized in a product container.

BRIEF DESCRIPTION OF THE DRAWING

The manner in which these and other objects of the invention are achieved will be best understood by reference to the following description, the appended claims, and the Figures of the attached drawing wherein:

FIG. 1 is an elevation view of a product container with portions thereof cut away to disclose the internal components including the sealing gland of this invention;

FIG. 2 is an enlarged partial elevational view thereof with the applicator disassembled from the reservoir assembly and illustrating the peripheral seal established by the sealing gland within the reservoir assembly;

FIG. 3 is an exploded view of the subassembly created by joining the sealing gland to the portal bushing, with the sealing gland cut away to illustrate an annular lip and a diaphragm thereon; and FIG. 4 is a view similar to FIG. 3 but illustrating a sealing gland on which a right cylindrical portion is disposed for providing predetermined sealing parameters.

DESCRIPTION OF THE PREFERRED EMBODIMENT

Turning now to the drawing and more particularly to FIG. 1, there is illustrated a product container 10 in which a reservoir assembly 12 and an applicator 14 are detachably joined. The applicator 14 is constructed of a cylindrical shell 16 within which is mounted a cup-shaped insert 18 providing female threads 20 and securing one end of a shaft 22. At the other end of the shaft 22, longitudinally arranged bristles form a tip 24 to which product adheres when the applicator 14 is joined to the reservoir assembly 12. Other types of applicator tips are known in that the bristles on some tips are radially arranged, while other tips have only spiral grooves and still other tips are made of either felt or cellular foams in both the open and closed cell varieties. Although these other types of tips are not shown in this disclosure to be useable with the portal bushing of this invention, no reason exists to preclude such utilization.

Construction of the reservoir assembly 12 is illustrated in FIG. 2 where the applicator 14 is shown entering into the reservoir assembly 12 through a portal bushing 26. A reservoir body 28, sized in accordance with the amount of product to be stored, is specially configured to receive and fixedly retain the bushing 26. To prevent leakage of product from the reservoir assembly 12, a sealing gland 30 is affixed on the end of the bushing 26 and provides a peripheral seal 32 between the bushing 26 and the reservoir body 28, along with a portal seal 34 around the applicator 14. Any means can be utilized to fixedly retain the bushing 26 within the reservoir body 28, such as engaging a lip 36 on the bushing 26 into a groove 38 on the reservoir body 28 for translating the thrust forces and penetrating cutting teeth 40 on the bushing 26 into the reservoir body 28 for translating the torsional forces. Male threads 42 are disposed on the bushing 26 for mating with the female threads 20 of the applicator 14 when joining the reservoir assembly 12 thereto. The bushing 26 has an open ended chamber 44 therein serving as a portal 46 through which the applicator 14 gains access into the reservoir assembly 12. One end of the bushing 26 is specially configured with a tapered lead 48, an annular shoulder 50, and an annular groove 52 for interlocking with the sealing gland 30.

As illustrated in FIG. 3, the gland 30 is structured in the form of a tubular frame 54 on which a means 56 for both sealing about and wiping against the applicator 14 and an annular lip 58 are integrally disposed. The sealing and wiping means 56 is disposed across the longitudinal axis of the tubular frame 54 at one axial end thereof, whereas the annular lip 58 is disposed on the interior wall of the tubular frame 54 at the other axial end thereof. The tubular frame 54 is conically shaped, being of minimum diameter at the sealing and wiping means end and of maximum diameter at the annular lip end. The sealing and wiping means 56 is comprised of a diaphragm 60 which includes an aperture 61 concentrically disposed about the longitudinal axis of the tubular frame 54. In cross section, the annular lip 58 is trapezoidal with converging sides 62 extending inwardly toward the axis of the tubular frame 54 and a flat face 63 extending across the converging sides 62. Any suitable elastic material may be utilized to fabricate the gland 30, such as an elastomeric and any suitable process may be utilized for its fabrication, such as molding.

When utilized within the reservoir assembly 12, the gland 30 is interlocked to the bushing 26 with the annular lip 58 engaging into the annular groove 52 and thereby, a subassembly of highly reliable integrity is created. Of course, the annular lip 58 must be expanded to pass over the annular shoulder 50 on the bushing 26, however, due to the elastic nature of the gland 30 and the tapered lead 48 on the bushing 26, this presents no great difficulty. The subassembly of the gland 30 and bushing 26 is then joined to the reservoir body 28 by directing the gland 30 into the open end thereof, after which the bushing 26 is forcibly inserted therein to complete the reservoir assembly 12. During this insertion process, the conical taper of the tubular frame 54 and the elastic nature thereof is effective to centrally locate the gland 30 within the reservoir body 28 and thereby establish a symmetrically distributed interface thereagainst.

Functionally, within the reservoir assembly 12, the peripheral seal 32 is created by the gland 30 at the symmetrically distributed interface, as illustrated in FIG. 2. This is so because radially directed sealing forces are developed within the gland 30 between the bushing 26 and the reservoir body 28 due to the tubular frame 54 and the annular lip 58 being compressed therebetween. The peripheral seal 32 covers a minimal surface having a cylindrical area equal to the inner periphery of the reservoir body 28 at the symmetrically distributed interface multiplied by the width of the flat face 63. Because of the magnitude of compression occurring is proportional to the combined radial thickness of the tubular frame 54 and the annular lip 58, the force exerted by the peripheral seal 32 can be predetermined within relatively precise limits by merely varying this combined thickness. The proportionality factor relating the sealing forces to the amount of compression can be either linear or nonlinear depending on the cross-sectional configuration of the annular lip 58. Because this cross-sectional configuration is trapezoidal on gland 30, as illustrated in FIG. 3, the proportionality factor will increase with increasing compression and is, therefore, nonlinear.

As illustrated in FIG. 1, the portal seal 34 results from the aperture 61 in the diaphragm 60 being enlarged radially by the shaft 22 of the applicator 14 to thereby distort the diaphragm 60 and develop radially directed sealing forces at the interface between the diaphragm 60 and the shaft 22. Because diaphragm distortion is directly related to the flexure characteristics of the diaphragm 60, the force exerted by the portal seal 34 is controllable within predetermined limits by configuring the diaphragm 60 to have a particular thickness gradient and/or by particularly sizing the aperture 61. Of course, the tip 24 passes in both directions through the aperture 61 during utilization of the product container 10 and, if desired, a wiping action thereover can be accomplished by configuring the diaphragm 60 to provide particular flexure characteristics in the direction of applicator withdrawal. Therefore, both the sealing force against the shaft 22 and the wiping action over the bristled tip 24 must be considered together when determining the configuration of the diaphragm 60.

Where a peripheral seal having predetermined sealing parameters is desired, a sealing gland 30' may be configured as illustrated in FIG. 4, where because of the similarities which exist with the sealing gland 30 illustrated in FIG. 3, similar parts are identified by the same reference numerals as used in FIG. 3, but with a prime (') added. In this configuration, an annular lip 58' and a means 56' for both sealing about and wiping against the applicator are again disposed at opposite ends of a tubular frame 54'. The tubular frame 54' is conically tapered only between the annular lip 58' and the sealing and wiping means 56', with the annular lip 58' being disposed on a right cylindrical portion 64 and a raised rim 66 being peripherally disposed about the sealing and wiping means end thereof. As before, the taper of the tubular frame 54' increases in diameter from the sealing and wiping means end to the annular lip end. The annular lip 58' has parallel sides 68 projecting radially inward from the tubular frame 54' toward the longitudinal axis thereof and presents an arcuate face 70 which extends from one parallel side 68 to the other. Again, the sealing gland 30' affixes to the end of a portal bushing 26' which is identical to the portal bushing 26 shown in FIG. 3.

When utilized in the reservoir assembly, the gland 30' is interlocked to the bushing 26' and seated within the reservoir body in the same manner as was discussed previously for the gland 30 illustrated in FIG. 3. Again the conical taper of the tubular frame 54' and the elastic nature thereof are effective to centrally locate the gland 30' within the reservoir body and thereby establish a symmetrically distributed interface thereagainst. A peripheral seal is created as a result of radially directed sealing forces developing within the gland 30' between the bushing 26' and the reservoir body due to the tubular frame 54' and the annular lip 58' being compressed therebetween. Again the sealing forces are exerted over the symmetrically distributed interface and are proportional to the magnitude of this compression. Due to the arcuate face 70, the proportionality factor is initially nonlinear, but becomes linear after the arcuate face 70 is fully compressed. Also, the sealing forces on the peripheral seal can be predetermined within relatively precise limits by merely varying the combined radial thickness of the tubular frame 54' and annular lip 58'. Furthermore, the annular lip 58' being disposed on the right cylindrical portion 64 of the tubular frame 54' results in distribution of the sealing forces over the outer surface of the right cylindrical portion 64. Since the right cylindrical portion 64 can have any desired width, the area of the symmetrically distributed interface at the peripheral seal can also be predetermined within relatively precise limits.

A portal seal about the applicator, as well as a wiping action thereover, results from the sealing gland 30' in the same manner as discussed previously for the sealing gland 30 illustrated in FIG. 3. Of course, the length of the tubular frame 54' separating the annular lip 58' from the sealing and wiping means 56' can be varied in accordance with the particular application. The raised rim 66 on the tubular frame 54' can be sized to provide for initial alignment within the reservoir body on lengthy glands or to provide a supplemental peripheral seal.

It should be readily appreciated by those skilled in this art that the sealing gland of this invention may be incorporated into a reservoir assembly for the creation of a peripheral seal about a portal bushing over a minimal surface. Also, this sealing gland interlocks with the portal bushing to establish a subassembly having great integrity. Furthermore, the sealing parameters of the peripheral seal can be predetermined within realtively precise limits by controlling the configuration of the sealing gland.

It should be understood that the present disclosure has been made only by way of example and that numberous changes in the details of construction and the combination or arrangement of parts may be resorted to without departing from the true spirit and the scope of this invention. Therefore, the present disclosure should be construed as illustrative rather than limiting.

What I claim is:

1. A sealing gland for providing a peripheral seal between a portal bushing and a reservoir body within a reservoir assembly and a portal seal about an applicator passing therethrough when the reservoir assembly is utilized as part of a product container, said fabricated gland being facricated of elastic material and comprising:

a tubular frame including a conical taper on the exterior thereof, said taper being effective to centrally locate said sealing gland within the reservoir assembly and to establish a symmetrically distributed interface therein;

an annular lip disposed on the interior wall of said tubular frame and to one longitudinal end thereof, said annular lip being engageable with an annular groove on the portal bushing to interlock said sealing gland thereto and being compressible within the reservoir assembly to develop a seal between the portal bushing and the reservoir body;

means for sealing about and wiping against the applicator, said sealing and wiping means being disposed on said tubular frame at the opposite longitudinal end from said annular lip, said tubular frame being of minimum diameter at the sealing and wiping means end and of maximum diameter at the annular lip end; and a raised rim disposed about the external periphery of said tubular frame on the sealing and wiping means end thereof.

2. The sealing gland of claim 1 wherein said annular lip is configured to have a trapezoidal cross section, the nonparallel sides of said lip being disposed to converge toward the longitudinal axis of said tubular frame.

3. The sealing gland of claim 1 wherein said annular lip presents an arcuate face, said arcuate face extending across parallel sides, said parallel sides projecting inwardly from said tubular frame toward the longitudinal axis thereof.

4. The sealing gland of claim 1 wherein the conical taper of said tubular frame is disposed intermediate to said annular lip and said sealing and wiping means, said annular lip being disposed on a right cylindrical portion of said tubular frame, said right cylindrical portion being effective to establish predetermined sealing parameters for the peripheral seal.

5. The sealing gland of claim 1 wherein said sealing and wiping means comprises a diaphragm, said diaphragm having an aperture concentrically disposed about the longitudinal axis of said tubular frame, said aperture being expandable to receive the applicator therethrough.

6. The sealing gland of claim 5 wherein said annular lip is configured to have a trapezoidal cross section, the nonparallel sides of said lip being disposed to converge towards the longitudinal axis of said tubular frame.

7. The sealing gland of claim 5 wherein said annular lip is configured to have a trapezoidal cross section, the nonparallel sides of said lip being disposed to converge towards the longitudinal axis of said tubular frame; wherein the conical taper of said tubular frame is disposed intermediate to said annular lip and said wiper means, said annular lip being disposed on a right cylindrical portion of said tubular frame, said right cylindrical portion being effective to establish predetermined sealing parameters for the peripheral seal.

8. The sealing gland of claim 5 wherein said annular lip presents an arcuate face, said arcuate face extending across parallel sides, said parallel sides projecting inwardly from said tubular frame toward the longitudinal axis thereof.

9. The sealing gland of claim 5 wherein said annular lip presents an arcuate face, said arcuate face extending across parallel sides, said parallel sides projecting inwardly from said tubular frame toward the longitudinal axis thereof; wherein the concial taper of said tubular frame is disposed intermediate to said annular lip and said sealing and wiping means, said annular lip being disposed on a right cylindrical portion of said tubular frame, said right cylindrical portion being effective to establish predetermined sealing parameters for the peripheral seal.

* * * * *